United States Patent
Tropper

(10) Patent No.: US 11,540,087 B1
(45) Date of Patent: Dec. 27, 2022

(54) TRACKER OR LOCATOR TO MINIMIZE BATTERY USAGE AND PROLONG BATTERY LIFE BY CHANGING MODES OF OPERATION BASED ON WHETHER CERTAIN CRITERIA IS MET

(71) Applicant: David Tropper, Kew Gardens, NY (US)

(72) Inventor: David Tropper, Kew Gardens, NY (US)

( * ) Notice: Subject to any disclaimer, the term of this patent is extended or adjusted under 35 U.S.C. 154(b) by 0 days.

(21) Appl. No.: 17/109,298

(22) Filed: Dec. 2, 2020

(51) Int. Cl.
| | |
|---|---|
| H04W 4/029 | (2018.01) |
| H04W 4/14 | (2009.01) |
| H04W 4/02 | (2018.01) |
| H04W 4/024 | (2018.01) |
| H04W 52/02 | (2009.01) |
| H04W 4/021 | (2018.01) |

(52) U.S. Cl.
CPC .......... *H04W 4/029* (2018.02); *H04W 4/021* (2013.01); *H04W 4/023* (2013.01); *H04W 4/024* (2018.02); *H04W 4/14* (2013.01); *H04W 52/0254* (2013.01)

(58) Field of Classification Search
CPC . H04W 52/0254; H04W 4/029; H04W 4/024; H04W 4/021; H04W 4/023; H04W 4/14
USPC ...................................................... 455/456.3
See application file for complete search history.

(56) References Cited

U.S. PATENT DOCUMENTS

| | | | | |
|---|---|---|---|---|
| 10,652,821 | B2 * | 5/2020 | Doyle | H04L 67/22 |
| 2004/0174264 | A1 * | 9/2004 | Reisman | G08B 21/0202 |
| | | | | 340/573.4 |
| 2005/0068169 | A1 * | 3/2005 | Copley | G08B 21/0283 |
| | | | | 340/539.13 |
| 2008/0143604 | A1 * | 6/2008 | Mock | G01S 5/0205 |
| | | | | 342/450 |
| 2012/0313777 | A1 * | 12/2012 | Zazula | H04L 1/00 |
| | | | | 707/802 |
| 2015/0281890 | A1 * | 10/2015 | Chen | H04W 4/021 |
| | | | | 455/456.1 |
| 2018/0061209 | A1 * | 3/2018 | Kumar | H04W 4/029 |

* cited by examiner

*Primary Examiner* — William Nealon
(74) *Attorney, Agent, or Firm* — Robert J. Hess; Hess Patent Law Firm

(57) ABSTRACT

A tracker that conserves battery power by keeping its cellular module off as long as its modules determine there is no need to turn the cellular module on. The modules include those for detecting motion, detecting whether the tracker is within confines of a geofence, detecting whether the GPS coordinates of the tracker correspond to those most common from past use or correspond to those for work/home, detecting whether wireless connectivity is available other then via a cellular network) and detecting whether the tracker is more than a predetermined distance away from a user's cellular device.

8 Claims, 4 Drawing Sheets

| TRACKER 10: MODULES | TRACKER 10: COMPONENTS | TRACKER 10: FUNCTIONS |
|---|---|---|
| Power module 12 | Battery 30 | Powers all modules |
| cellular network module 14 (integrated circuit (IC) chip) | GPS and data transmission capability 40 via antenna 42 | Communicates accordingly with an external server 44 |
| Motion detector module 16 | Motion detector 50 | If no motion, then criteria is met. |
| Identification module 18 | Identifier logic 60 and storage 62 | If retrieved GPS coordinates correspond with those stored, then criteria is met. |
| Geofence module 20 | Geofence logic 70 | If tracker 10 is within confines of geofence, then criteria is met. |

FIG. 1

| TRACKER 10: MODULES | TRACKER 10: COMPONENTS | TRACKER 10: FUNCTIONS |
|---|---|---|
| Power module 12 | Battery 30 | Powers all modules |
| cellular network module 14 (integrated circuit (IC) chip) | GPS and data transmission capability 40 via antenna 42 | Communicates accordingly with an external server 44 |
| Motion detector module 16 | Motion detector 50 | If no motion, then criteria is met. |
| Identification module 18 | Identifier logic 60 and storage 62 | If retrieved GPS coordinates correspond with those stored, then criteria is met. |
| Geofence module 20 | Geofence logic 70 | If tracker 10 is within confines of geofence, then criteria is met. |

FIG. 1 (Continuation)

| TRACKER 10: MODULES | TRACKER 10: COMPONENTS | TRACKER 10: FUNCTIONS |
|---|---|---|
| Pairing module 22 | Pairing logic 80 | If within predetermined distance from cellular device that tracker 10 is paired with via pairing logic 80, then criteria is met. |
| Wireless connectivity module 24 | Conventional BLUETOOTH and Wi-Fi connectivity circuitry and programming | If wireless connectivity is established other than through a cellular communication network, such as through BLUETOOTH or Wi-Fi, then criteria is met. |
| Mode change module 26 | Programming | If criteria is met, retain mode. If not, then change the mode as applicable, i.e., from sleep mode (SM) to working mode (WM), from WM to network mode (NM), from NM to tracking mode (TM), from TM to WM, or from WM to SM. |

FIG. 2

| Sleep Mode (SM) | Working Mode (WM) | Network Mode (NM) | Tracking Mode (TM) |
|---|---|---|---|
| Entered when no motion detected | Entered when positive for motion | Entered from WM when meeting criteria all negative | Entered from NM when message received from server |
| Device will not connect to cell network, Wi-Fi, BLUETOOTH or geofence | Device will check Wi-Fi, BLUETOOTH, geofence for every predetermined interval | Device will connect to cellular network and check for message | Sends GPS location to server |

FIG. 2 (Continuation)

| Sleep Mode (SM) | Working Mode (WM) | Network Mode (NM) | Tracking Mode (TM) |
|---|---|---|---|
| Motion detected then device will go to WM | When motion detected device will repeat every interval | GPS Message received go to transmit | Stop transmit message received – go to WM |
| | When no motion detected device will go to SM | No Message Return to WM | |

TRACKER OR LOCATOR TO MINIMIZE BATTERY USAGE AND PROLONG BATTERY LIFE BY CHANGING MODES OF OPERATION BASED ON WHETHER CERTAIN CRITERIA IS MET

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of conserving battery life in devices suited for locating, tracking and monitoring pets and animals (such as canines), children, disoriented humans (such as those afflicted with dementia, amnesia or Alzheimer's disease), and items (such as vehicles).

2. Description of Related Art Including Information Disclosed Under 37 CFR 1.97 and 37 CFR 1.98

U.S. Pat. Application publication no. 2020/012044, whose contents are incorporated herein by reference, provides for a portable electronic facility for effecting location-based services. It recognizes that the battery life of the portable electronic facility may be improved by limiting the amount of time that the portable electronic facility is transmitting data: the transmission electronics may be powered down the rest of the time. It follows that methods for limiting the amount of time that the portable electronic facility is sending and/or receiving data should be present. These methods may comprise varying the length and/or frequency of transmissions to and/or from the portable electronic facility.

In addition, the aggregate of a plurality of datum from one or more portable electronic facilities may comprise aggregate data, which may be stored within a database. Such aggregate data may be disaggregated and provided to the third-party service provider as a single data point. This may be useful, for instance, for a service that provides to the end user a map showing the location of a pet associated with the user, wherein the pet may be fitted with a collar containing a portable electronic facility and in the establishment of a geofence and the monitoring of the portable electronic facility with respect to its crossing the geofence.

A person who's disoriented may not know their location and identity Caretakers for such disorientated persons require a way to locate such a person should they wander off.

Pets, such as canines or other animals, also may wander off or may run away from their owners to become lost. Their owners likewise require a way to locate their missing pet and there have been a number of solutions provided for utilizing an electronic means for location tracking of the animal. Misplaced or stolen items, such stolen vehicles, are sometimes equipped with electronic tracking devices as well to help authorities or owners recover them.

U.S. Pat. application publication no. 2017/0311573, whose contents are incorporated herein by reference, provides for an interactive system for monitoring health and movement of an animal via an elongated band adapted to encircle on a body part of an animal. It includes a tracking chip to monitor movement of the animal within and outside of a geofence, a lock to provide an opening and closing of the elongated band, a device for health monitoring to collect a data set for a plurality of vital signs of the animal, and a user interface to notify a pet owner about the outside movement of the animal from the geofence. Further, the system enables the authorized users to log into the communicating device such as a computer or any other computing device and track the movement and view health information of the animal while it is needed.

U.S. Pat. No. 6,720,879 B2 relates to an animal collar for locating and tracking animals. The animal collar is provided with a digital video camera that may be remotely controlled to transmit in real time, full motion video signals over a broadband wireless communication network to allow a pet owner to view the immediate surroundings of a lost pet. The animal collar is further provided with a global positioning (GPS) unit that communicates with GPS satellites to determine the geographic coordinates of the animal collar.

U.S. Pat. No. 7,705,736 B1 pertains a GPS data acquisition collar incorporating an individualized rugged watertight collar that monitors factors, including GPS location, gazing patterns, elevation, feeding patterns, temperature, movement speed, sleep patterns and signaling or beacon tracking options. Additionally, the present invention provides options for visual representation or programming alerting of factors that may affect an animal or herd of animals in a monitored and recorded environment.

U.S. Pat. No. 8,615,252 B2 describes a collar tracking system that includes an RFID system with a modem, an electric fence with a plurality of boundaries that is in communication with the RFID system and a plurality of power modes, a plurality of electronic circuitry that includes a battery, an open charging electrode, a smart protection circuitry to prevent a short to the battery and an antenna.

U.S. Pat. No. 5,857,433 A, whose contents are incorporated herein by reference, discloses a device for training/controlling and tracking an animal. The device includes both an aversive stimuli unit and a global positioning satellite system unit in the housing. Coupled to the housing is a harness, collar or other mechanism for attaching the device to an animal. The aversive stimuli unit is remotely operable using a hand-held control unit to aversively stimulate the animal wearing the housing. The global positioning satellite unit coupled to the housing allows determination of the animal's position relative to the operator of the hand-held control unit. A preferred embodiment of the present invention is designed particularly for tracking and training or controlling one or more dogs.

U.S. Pat. No. 8,543,134 B2, whose contents are incorporated herein by reference, relates to an animal collar having cellular network connectivity to facilitate tracking of an animal and greater communication therewith over great distances. The device further provides improved low light visualization of the collar and the ability to communicate with the animal or an individual who has recovered the animal after it has strayed away from its home. Applications include recovery of a lost or stolen pet, facilitating communication during a hunting exercise, communication with service animals in the military/law enforcement/rescue operations, and finally for animal training purposes.

SMS (short message service) is a text messaging service component of most telephone, internet, and mobile device systems. It uses standardized communication protocols to enable mobile devices to exchange short text messages. The protocols allowed users to send and receive messages of up to 160 characters (when entirely alpha-numeric) to and from GSM mobiles. Although most SMS messages are sent from one mobile phone to another, support for the service has expanded to include other mobile technologies, such as ANSI CDMA networks and Digital AMPS.

GPS, which stands for Global Positioning System, is a radio navigation system that allows land, sea, and airborne users to determine their exact location, velocity, and time 24 hours a day, in all weather conditions, anywhere in the world. The capabilities of today's system render other well-known navigation and positioning "technologies"—namely the magnetic compass, the sextant, the chronometer, and radio-based devices—impractical and obsolete. GPS is used to support a broad range of military, commercial, and consumer applications.

24 GPS satellites (21 active, 3 spare) are in orbit at 10,600 miles above the earth. The satellites are spaced so that from any point on earth, four satellites will be above the horizon. Each satellite contains a computer, an atomic clock, and a radio. With an understanding of its own orbit and the clock, the satellite continually broadcasts its changing position and time. (Once a day, each satellite checks its own sense of time and position with a ground station and makes any minor correction.) On the ground, any GPS receiver contains a computer that "triangulates" its own position by getting bearings from three of the four satellites. The result is provided in the form of a geographic position—longitude and latitude—to, for most receivers, within a few meters.

If the receiver is also equipped with a display screen that shows a map, the position can be shown on the map. If a fourth satellite can be received, the receiver/computer can figure out the altitude as well as the geographic position. If you are moving, your receiver may also be able to calculate your speed and direction of travel and give you estimated times of arrival to specified destinations. Some specialized GPS receivers can also store data for use in Geographic Information Systems (GIS) and map making.

GPS has become the de-facto medium and almost synonymous with the Global satellite navigation system (GNSS). However, there are other navigation systems also like GLONASS, BeiDou, Galileo, Quasi-Zenith and NavIC by India.

BLUETOOTH refers to a wireless technology standard used for exchanging data between fixed and mobile devices over short distances using UHF radio waves in the industrial, scientific and medical radio bands, from 2.402 GHz to 2.480 GHz, and building personal area networks (PANS). It was originally conceived as a wireless alternative to RS-232 data cables. BLUETOOTH wireless technology standard is managed by the Bluetooth Special Interest Group (SIG), which oversees development of the specification, manages the qualification program, and protects the trademarks. A manufacturer must meet Bluetooth SIG standards to market it as a Bluetooth device. A network of patents apply to the technology, which are licensed to individual qualifying devices.

A geofence is a virtual perimeter for a real-world geographic area. A geofence could be dynamically generated—as in a radius around a point location, or a geofence can be a predefined set of boundaries (such as school zones or neighborhood boundaries). The use of a geofence is called geofencing, and one example of usage involves a location-aware device of a location-based service (LBS) user entering or exiting a geofence. This activity could trigger an alert to the device's user as well as messaging to the geofence operator. This information, which could contain the location of the device, could be sent to a mobile telephone or an email account.

It is desired to provide for a tracking device that conserves battery power by disabling power to access a cellular network as long as certain criteria has been met pertaining to motion detection, known location detection, geofence detection, and Wi-Fi or BLUETOOTH connectivity detection.

BRIEF SUMMARY OF THE INVENTION

One aspect of the invention relates to a tracker suited to track or monitor an animal such as a canine in a manner that conserves battery life of batteries that power the tracker.

An internal GPS chip and cell module are used in the tracker in order to find GPS coordinates and send those GPS coordinates to a server where they can be viewed in an app or on an online portal.

A motion detector is built into the tracker so that when no motion is detected for a predetermined amount of time, it signals the cell module and GPS to turn off. For instance, for the entire time that a pet is sleeping, the battery is not being used to keep the cell module connected to the network.

When the motion detector senses movement, its programming enables the tracker to identify the most common GPS coordinates and/or use the GPS coordinates identified as home or work by the end user when those GPS coordinates match the current location of the device while the cell module is turned off. When the GPS chip senses a change in those coordinates, it sends a message to the cell module to wake up.

A geo-fence creation capability is provided for the end-user to implement geo-fence so the cell module will be turned off.

A Wi-Fi and Bluetooth chip that, paired to the user's cell phone, will enable the tracker to turn off the cell module when the is in a predetermined field of distance from the end-user/s cell phone.

Storage is provided that allows all GPS data to be stored locally on the device so that the cell module only when prompted to by an external server sending a SMS message.

BRIEF DESCRIPTION OF THE SEVERAL VIEWS OF THE DRAWINGS

For a better understanding of the present invention, reference is made to the following description and accompanying drawings, while the scope of the invention is set forth in the appended claims.

FIG. 1 is a table with blocks identifying components in modules in accordance with the invention. Unless otherwise explained elsewhere, all components are of conventional construction.

FIG. 2 is a table that identifies the various modes associated with the present invention.

DETAILED DESCRIPTION OF THE INVENTION

Turning to the drawing, FIG. 1 shows a table with blocks representing modules, components or functions of the tracker 10 in accordance with the invention. That is, the tracker 10 contains modules, which in turn contain components for carrying out various functions as set forth in the table. The modules include a power module 12 and a cellular network communication module 14. The power module 12 includes a conventional battery for powering all the components in the modules. The cellular network communication module 14 includes conventional GPS capability and conventional data transmission capability 40 over a wireless network (e.g., cellular) via an antenna 42.

In addition, there are modules that determine whether certain criteria is met. Such modules are a motion detector module 16, an identification module 18, a geofence module 20, a pairing module 22 and a wireless connectivity module 24. There is also a mode change module 26, which changes the mode of operation of the tracker 10 as applicable from sleep, working, cellular network access and tracking information modes, based upon input from the motion detector module 16, the identification module 18, the geofence module 20, the pairing module 22 and the wireless connectivity module 24.

The motion detector module 16 includes a motion detector 50 that senses whether the tracker 10 is at rest or in motion. If no motion is detected, then it could be that the pet that is wearing the tracker 10 is resting, sleeping or crated and thus the tracker 10 is stationary. For instance, the pet could be resting or crated at a neighbor's house (visiting for the first time) and the dog owner happened to go out of the neighbor's house at that time.

Further, the motion detector module 16 determines whether the tracker 10 enters sleep mode or working mode. If no motion is detected, then the tracker 10 enters sleep mode. If motion is detected, then the tracker 10 enters working mode and checks with the identification module 18.

The identification module 18 includes identifier logic 60 and storage 62 and becomes active in the working mode to compare the retrieved GPS coordinate currently for a match with stored GPS coordinates that correspond with the most common ones from numbers of times of their previous retrieval by the GPS or with home/work coordinates. If there is a match, then the tracker 10 goes back into sleep mode from working mode. If there is no match, then the tracker 10 will remain in working mode to check with the geofence module 20.

The geofence module 20 includes conventional geofence logic 70 to determine the tracker 10 is within the confines of the region bounded by the geofence or not. If so, then the tracker 10 goes back into sleep mode. If not, then the tracker 10 will remain in working mode and check with the pairing module 22.

The pairing module 22 includes conventional pairing logic 80 to pair with an end user's cellular device (such as cellular phone). Once paired, the pairing logic 80 also determines the distance separating the tracker 10 from the end user's cellular device. If the distance determined does not exceed a predetermined distance stored in memory, then the tracker 10 goes back into sleep mode. If the distance determined exceeds the predetermined distance, then the tracker 10 checks Wi-Fi or BLUETOOTH connectivity is available.

If neither Wi-Fi nor BLUETOOTH connectivity is available, then the tracker 10 will leave the working mode and enter the network mode to check for receipt of SMS messages, but after a predetermined period of time elapses, the tracker 10 repeats checking the modules again and for WiFi or bluetooth connectivity to determine whether to enter sleeping mode or working mode again and thus leave network mode.

If an SMS message is received, then the tracker 10 enters tracking mode to send a GPS location to a remote server. After transmission, the tracker 10 enters back into working mode.

The present invention can be considered to have a device mode, a working mode, a network mode, and a tracking mode as reflected in FIG. 2, which tabulates these modes.

For the device mode, the following should take place:
1. Power On Next to Cell Phone
2. List Of Wi-Fi Networks
3. Accept Desired network to set as "Known Area"
4. Pair To BLUETOOTH to Set Phone as "In Range"
5. Log Into Account to Set geofence For the working mode, the following takes place:
1. Device Checks for Movement
2. No Movement=Sleep Mode=Device will not connect to Cellular network/Wi-Fi/BLUETOOTH/geofence
3. Movement=Start Working Mode—Device Checks for known WiFi networks
4. Known Wi-Fi networks Detected=Device will not connect to the cellular network
5. No known Wi-Fi networks Detected=Device will check for known Bluetooth networks
6. Known BLUETOOTH networks detected=Device will not connect to the cellular network
7. No Known BLUETOOTH Networks Detected=Device will check geofence
8. Device In geofence—Device will not connect to the cellular network
9. Device NOT in geofence—Device will connect to the cellular network to receive message.

For the network mode, the following takes place:
1. Device connects to the cellular network
2. Device checks if there is a message from the server
3. Device transmits location if message received
4. Device continues to transmit until time out or stop message received.

For the tracking mode, the following takes place:
1. User sends tracking request from account
2. Server receives request
3. Server command to return tracking information—latitude/longitude
4. Server GOOGLE maps user account For pets, the tracker 10 may be contained within a collar that fits about the neck of the pet. For disoriented persons, the tracker 10 may be contained within a belt worn by such persons. For children, the tracker 10 may be contained with a backpack carried by such children. For motor vehicles, the tracker 10 may be hidden in undercarriage or the trunk.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A tracking device, comprising:
a tracker that includes
a cellular network communication module that is configured to establish communication with a cellular communication network to receive and transmit messages;
a motion detector that is configured to sense whether the tracker is at rest or in motion;
an operative global positioning system (GPS) that is configured to effect retrieval of a current GPS coordinates indicative of a current location of the tracker in response to the motion detector sensing that the tracker is in motion;
storage that is configured to store previous GPS coordinates that are indicative of previous locations of the tracker including any of the previous coordinates that were most often store;
programming that is configured to compare the current GPS coordinates with the stored previous GPS coordinates to ascertain whether the current location of the tracker, as indicated by the current GPS coordinates, match one of the previous locations of the tracker whose previous GPS coordinates were most often stored;
a power module that is configured to supply power to the cellular network communication module;
a detector module that senses a meeting of criteria and a lack of meeting of the criteria; and
a mode change module that is configured to change modes of operation as between sleep mode, working mode, network mode and tracking mode;
wherein the mode change module is configured to enter into the sleep mode in response to the motion detector sensing the tracker is at rest, the mode change module is configured to enter into the working mode and leave the sleep mode in response to the motion detector sensing the tracker is in motion, the mode change module being configured to leave the working mode and enter the network mode in response to the detector module sensing a lack of meeting of the criteria and to remain in the working mode in response to the detector module sensing the meeting of the criteria, the mode change module being configured to enter into the tracking mode and leave the network mode in response to receipt of a message, the mode change module being configured to enter into the working mode and leave the tracking mode in response to transmission of a response to the message that includes tracking information, wherein the mode change module is configured to disable access to power from the power module by the cellular network communication module during the sleep mode and also during the working mode and wherein the mode change module is configured to enable access to the power from the power module by the cellular network communication module during the network mode and also during the tracking mode,
wherein the detector module includes a geofence module that is configured to create a geofence region and that is configured to determine the criteria is met when the tracker is within confines of the geofence region, a pairing module configured to determine the criteria is met when paired to a cellular phone of an end user and the tracker is within a predetermined distance from the cellular phone of the end user, a wireless connectivity module configured to determine the criteria is met when establishing wireless connectivity other than through the cellular communication network and an identification module that is configured to determine the criteria is met when the retrieved coordinates match those that constitute the most common of the previously retrieved GPS coordinates that were stored.

2. The apparatus of claim 1, further comprising:
a tracking information module configured to access a radio navigation system that allows land, sea, and airborne users to determine their exact location, velocity, and time 24 hours a day, in all weather conditions, anywhere in the world and to retrieve coordinates from the accessed radio navigation system as the tracking information.

3. The apparatus of claim 1, wherein the retrieved coordinates are global positioning system coordinates.

4. The apparatus of claim 1, wherein the power module includes a battery and is configured to power an internal global positioning system chip and the cellular network module, wherein the internal GPS chip and the cellular network module are configured to interface with each other to find the GPS coordinates as the tracking information.

5. The apparatus of claim 1, wherein the is a short text message of a short message service (SMS).

6. A method of tracking, comprising:
providing a tracker that includes a cellular network communication module, a motion detector, an operative global positioning system (GPS), storage, and programming:
establishing communication via the cellular network communication module with a cellular communication network to receive and transmit messages;
sensing via the motion detector whether the tracker is at rest or is in motion;
effecting, via the operative GPS, retrieval of current GPS coordinates that correspond to a current location of the tracker, the operative GPS effecting the retrieval in response to the motion detector sensing that the tracker is in motion;
storing, via storage, previous GPS coordinates that were previously retrieved that are indicative of previous locations of the tracker;
comparing, via programming, the current GPS coordinates with the stored previous GPS coordinates to ascertain whether the current location of the tracker, as indicated by the current GPS coordinates, match one of the previous locations of the tracker whose previous GPS coordinates were most often stored;
supplying power via a power module to the cellular network communication module;
sensing via a detector module a meeting of criteria and that senses a lack of meeting of the criteria; and
changing modes of operation as between sleep mode, working mode, network mode and tracking mode via a mode change module,
wherein the mode change module enters into the sleep mode in response to the motion detector sensing the tracker is at rest, the mode change module enters into the working mode and leaves the sleep mode in response to the motion detector sensing the tracker is in motion, the mode change module leaves the working mode and enters the network mode in response to the detector module sensing a lack of meeting of the criteria and remains in the working mode in response to the detector module sensing the meeting of the criteria, the mode change module enters into the tracking mode and leaves the network mode in response to receipt of a message, the mode change module enters into the working mode and leaves the tracking mode in response to transmission of a response to the message that includes tracking information, wherein the mode change module disables access to power by the cellular network communication module to prevent establishing the communication with the cellular network during the sleep mode and also during the work mode and wherein the mode change module enables access to the power by the cellular network communication module to establish the communication with the cellular network during the network mode and also during the tracking mode, wherein the detector module includes a geofence module that creates a geofence region and that determines the criteria is met when the tracker is within confines of the geofence region, a pairing module that determines the criteria is met when paired to a cellular phone of an end user and the tracker is within a predetermined distance from the cellular phone of the end user, a wireless connectivity module that determines the criteria is met when establishing wireless connectivity other than through the cellular communication network and an identification module that determines the criteria is met when the retrieved coordinates match those that constitute the most common of the previously retrieved GPS coordinates that were stored.

7. The method of claim 6, further comprising:
accessing, with a tracking information module, a radio navigation system that allows land, sea, and airborne users to determine their exact location, velocity, and time 24 hours a day, in all weather conditions, anywhere in the world and to retrieve coordinates from the accessed radio navigation system as the tracking information.

8. The method of claim 6, further comprising:
powering an internal global positioning system chip and the cellular network module with a battery of the power module, wherein the internal GPS chip and the cell module interface with each other to find GPS coordinates as the tracking information.

\* \* \* \* \*